Jan. 25, 1955  G. A. BIERY ET AL  2,700,590
PROCESS FOR PREPARING LEATHER FROM TELEOST FISHSKINS
Filed Feb. 15, 1950

INVENTORS
GALEN A BIERY and
RICHARD W. SIMMONS
BY
Cushman, Darby & Cushman
ATTORNEYS Jan. 25, 1955  G. A. BIERY ET AL  2,700,590
PROCESS FOR PREPARING LEATHER FROM TELEOST FISHSKINS
Filed Feb. 15, 1950  5 Sheets-Sheet 2
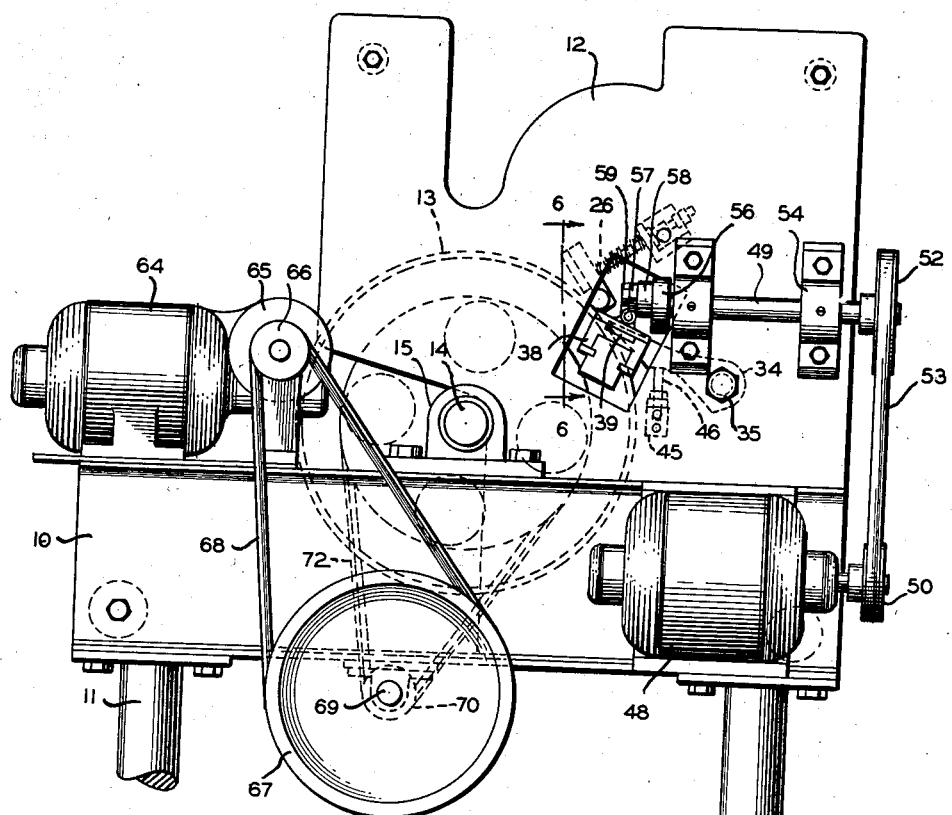
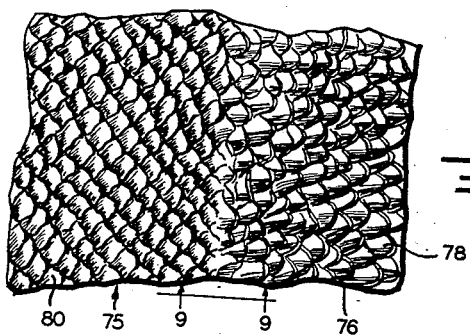
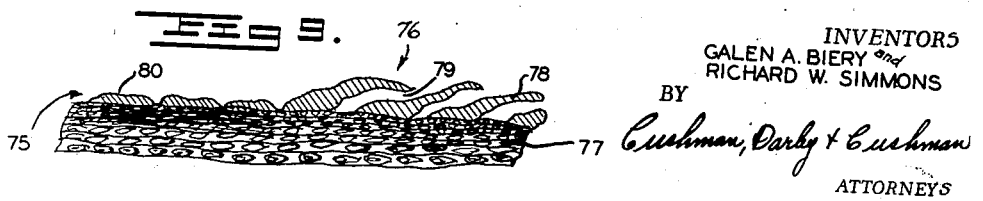
INVENTORS
GALEN A. BIERY and
RICHARD W. SIMMONS
BY
Cushman, Darby & Cushman
ATTORNEYS

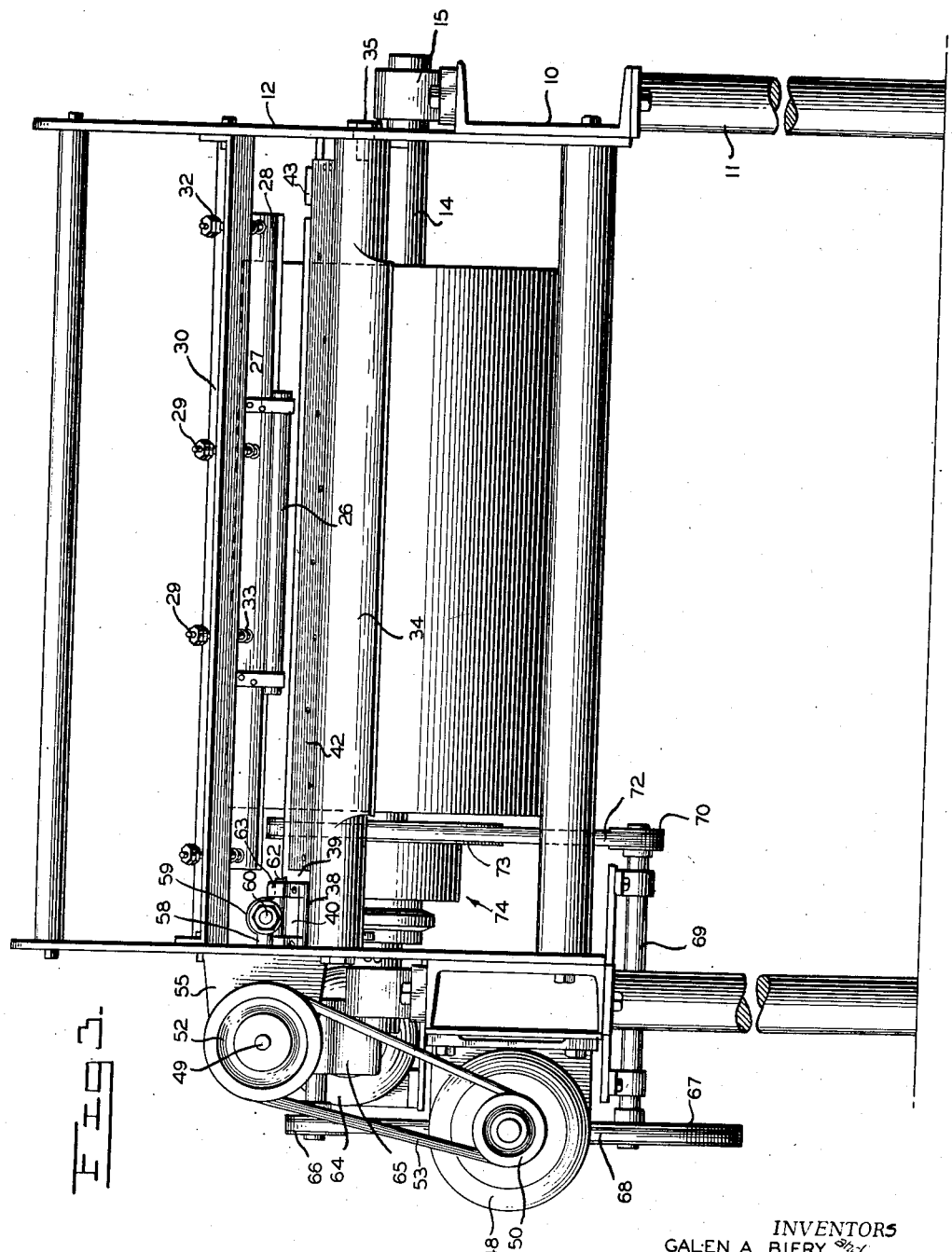

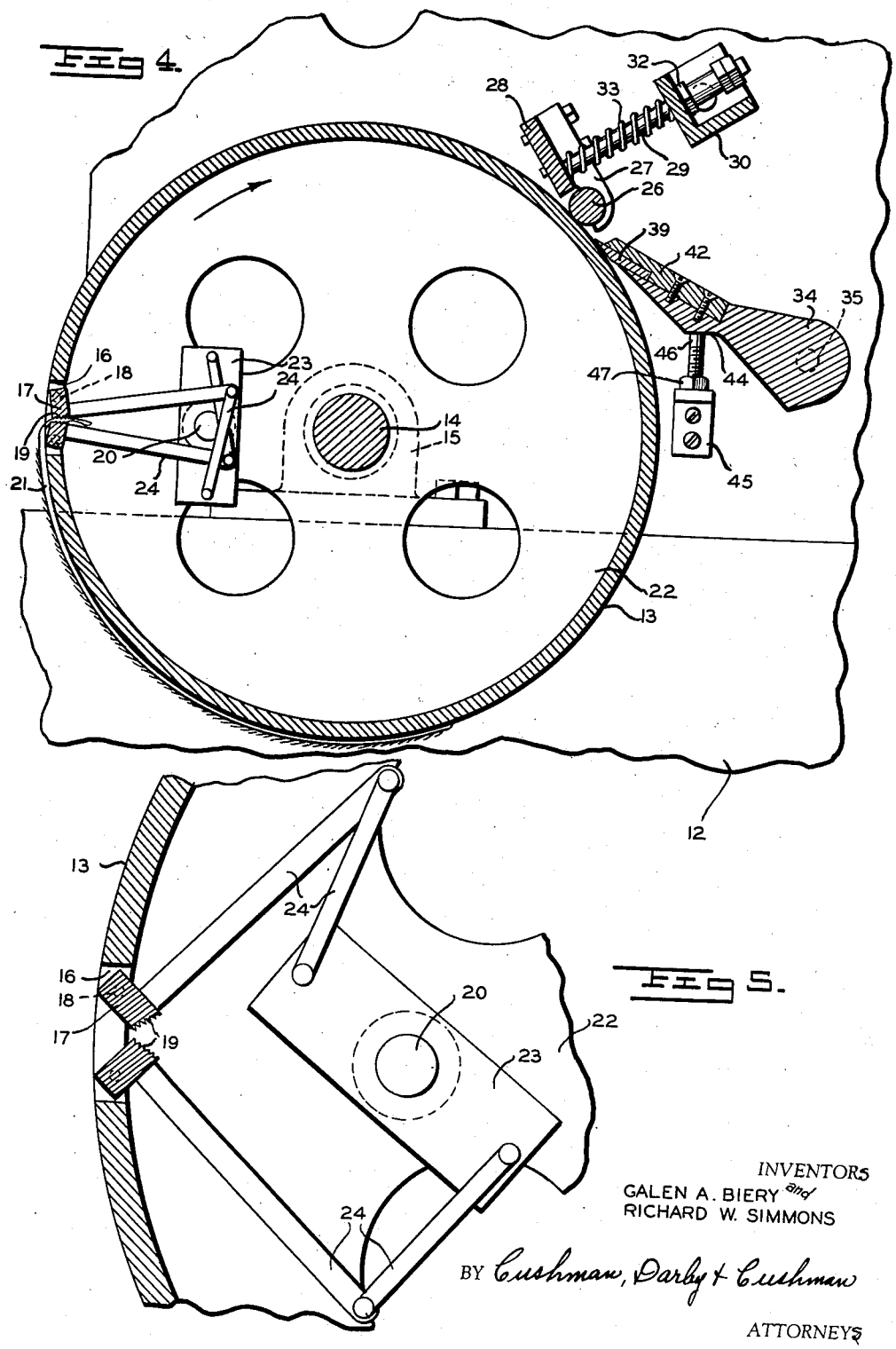

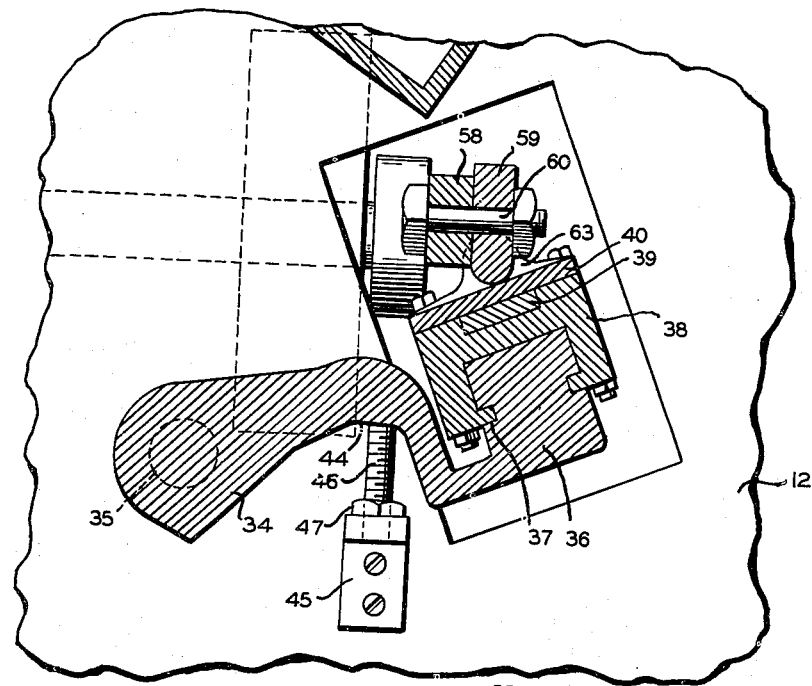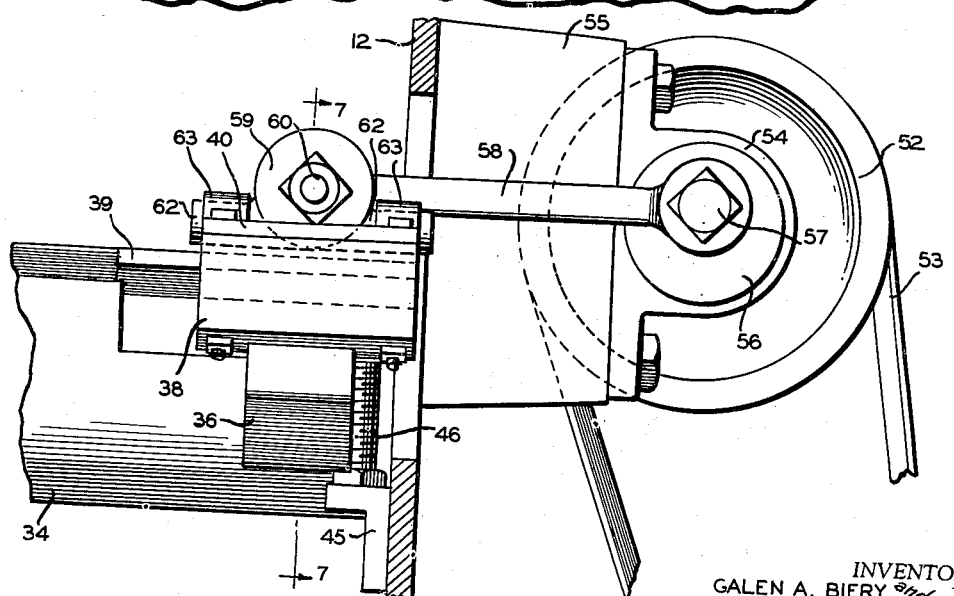

United States Patent Office 2,700,590
Patented Jan. 25, 1955

2,700,590

PROCESS FOR PREPARING LEATHER FROM TELEOST FISHSKINS

Galen A. Biery and Richard W. Simmons, Bellingham, Wash., assignors, by mesne assignments, to Pacific Laboratories, Inc., Bellingham, Wash., a corporation of Washington Application February 15, 1950, Serial No. 144,312

8 Claims. (Cl. 8—94.12)

This invention relates to leather manufacture, particularly to the manufacture of leather from the skins of teleost fishes, such as salmon.

Heretofore, it has not been possible to produce full-grained leather from scaled fish skins, due primarily to the lightness and structure thereof, which present unique tanning problems. In the first place, the collagen of fish skins is chemically different from that of mammals, being more readily hydrolyzable, a difference apparent in the differing properties of fish glue as contrasted to other animal glues. This property presents the problem of preventing hydrolysis of the collagen in the skins before it can be fixed by tanning agents. Second, the orientation of the fibers in teleost fish skins is different from the arrangement thereof in sharks and mammalian hides. In teleost fishes the skin fibers lie in planes along the sides of the fish, and an individual skin may consist of from eight to perhaps twenty separable layers of intermeshed fibers. This orientation confers truly remarkable strength on leather made therefrom, but has the disadvantage of markedly slowing the penetration of tanning agents. Third, the total leather forming collagenous layer of fish skin is less than half the total thickness of a naturally thin skin, whereby losses of collagen normal in tanning mammalian hides would consume all the leather forming thickness of fish skins.

The non-collagenous portion of the teleost fish skin comprises a heavy scale pocket layer essentially keratinous in nature. While in the case of some skins, for example, snakeskin, the scale pockets may be permitted to remain on the leather and serve as ornamentation and a means of identifying the genuine material, in the case of fish skin the keratinous scale pocket layer does not tan, but merely dries on the surface to give a very harsh, unpleasant grain.

The comparatively light epithelium of mammalian hides is readily removable by the common tannery processes of liming and/or bating. None of the standard approaches, however, is adaptable to removal of the scale pocket layer from fish skin, nor are any of the usual reagents capable of softening the cortex thereof without destroying the collagen.

It will be evident, therefore, that it is impossible to produce leather from fish skins by usual tannery procedures. Common chemical and mechanical methods being inadequate, the present invention employs the expedient of longitudinally splitting the skin to cut the scale pockets therefrom. This procedure is exceedingly difficult and critical because of the thinness and lack of rigidity of the skins, and is possible only by preliminarily treating the skins and working upon them in the manner described fully below.

It is among the objects of the present invention, accordingly, to provide a novel tanning method for teleost fish skins including as a step thereof a splitting operation to remove scale pockets therefrom. A further object is to provide a tanning method wherein fish skins may be readily and thoroughly tanned throughout, without detrimental loss of collagen.

Another object of the invention is to provide mechanism adapted to split the scale pockets from teleost fish skins tanned according to the method of the invention. Still another object is to provide a machine adapted to remove the scale pockets in a manner resulting in a smooth skin surface retaining the original scale pattern on the finished leather.

A further object is to provide a useful, pliable, and durable full-grained leather manufactured from the skin of teleost fishes, of great strength and distinctive appearance. Further objects will be in part obvious and in part pointed out hereinafter.

The invention and the novel features thereof may best be made clear from the following description and the accompanying drawings, in which:

Figure 2 is a side elevation of the machine of Figure 1;

Figure 3 is an elevational view of the opposite end of the machine of Figure 1;

Figure 4 is an enlarged sectional view taken on the line 4—4 of Figure 1;

Figure 5 is a greatly enlarged view corresponding partially to Figure 4, showing details of the clamp jaw actuating mechanism;

Figure 6 is an enlarged sectional view taken on the line 6—6 of Figure 2, showing details of the knife reciprocating mechanism;

Figure 7 is a sectional view taken on the line 7—7 of Figure 6, showing further details of the knife reciprocating and adjusting mechanisms;

Figure 8 is a plan view of a tanned and finished salmon skin, from half of which the scale pockets have been removed according to the present invention, and Figure 9 is an enlarged sectional view taken on the line 9—9 of Figure 8.

Figure 1:
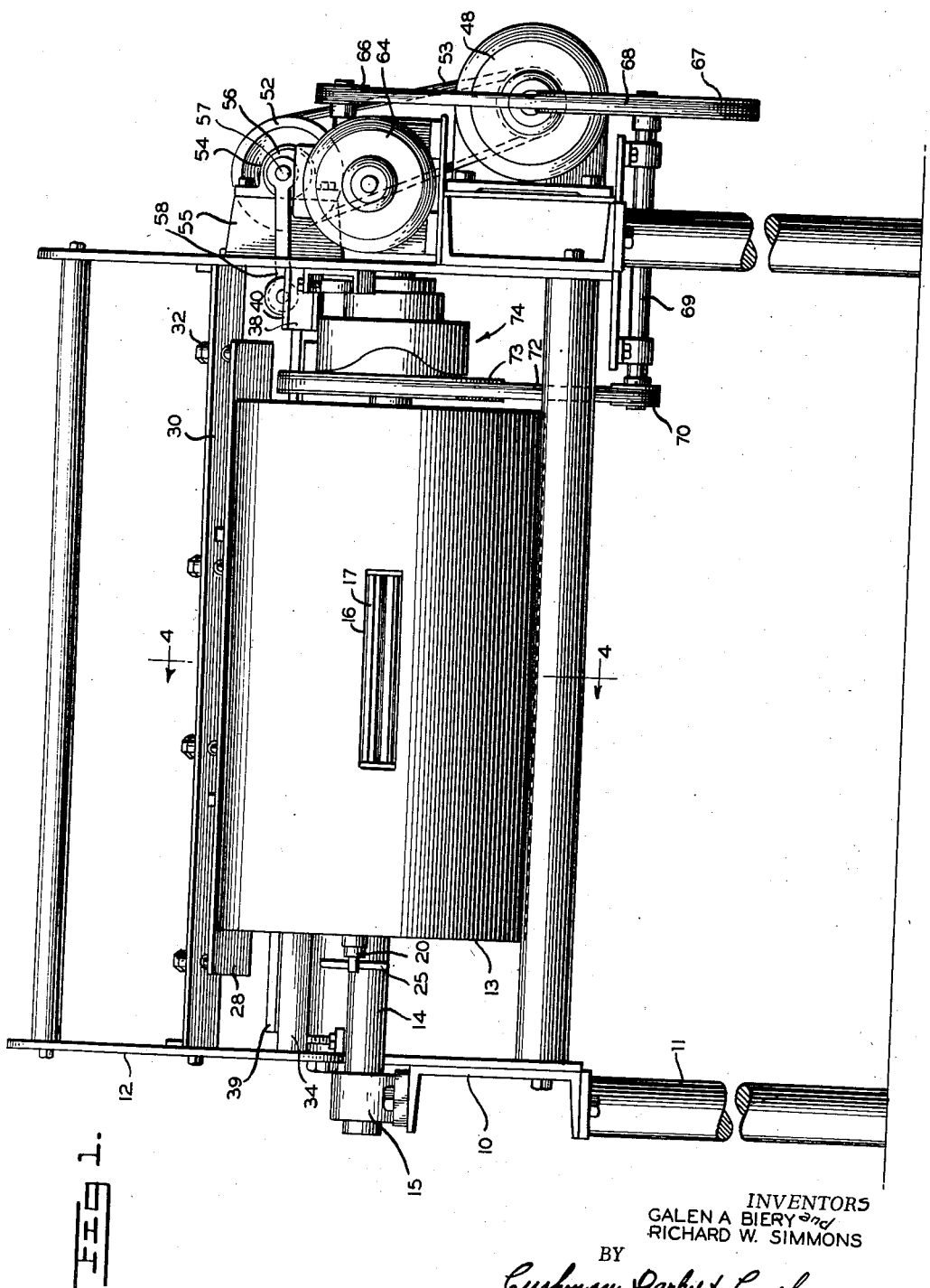
Figure 1 is an end elevation of a preferred embodiment of the machine of the present invention.

Referring first to the method forming a part of the present invention, salmon skins as an illustrative example may be suitably removed from the fish, washed, and packed in salt for preservation and shipping. On arrival at the tannery, the skins are removed and freshened, as by immersion in gently flowing fresh water for two days at a temperature preferably not exceeding 50° F. The freshening step should not exceed three days in duration lest the skins be detrimentally affected.

Next, the skins may be subjected to a mild alkaline soak, as in a 0.5% sodium carbonate solution for eighteen hours with intermittent paddling. The object of this step is to plump the skins, loosen the fibers thereof, and dissolve out some non-collagenous materials. Liming is unsatisfactory for this purpose, since lime will completely hydrolyze salmon skins by the time it has plumped them. Obviously, however, salts other than sodium carbonate may be employed, alkaline salts which in solutions of less than 5% effect a pH of from 8.5 to 10 being generally satisfactory. Examples of other salts of this class are sodium phosphate, borate, metasilicate, acetate and hexametaphosphate.

Following the alkaline soak, the skins may be passed through a fleshing machine and then washed with cold water. Next, the skins are desirably paddled in a pickling solution made up, for example, as follows:

Common salt, 20 lbs.
Ammonium alum, 30 lbs.
Water to make 50 gals.

Paddling is continued until the skins have been completely struck through with salt and acid, one hour usually being sufficient. The skins may, however, if desired, remain in the pickle for several months. Alum is most satisfactory in the pickling bath, combining the desired acidity and electrolyte concentration, which successfully neutralizes the skins and at the same time causes them to fall. Standard pickles of salt and sulfuric acid may be employed, but are not so satisfactory as alum. Acidic salts of strong acids and weak bases may be substituted for the alum, as for example, ammonium chloride, zinc sulfate, and aniline hydrochloride.

The skins are by the preliminary steps described above made ready for the most critical stage of the process, which is a surface hardening or partial tanning treatment adapted to firm the skins sufficiently for a splitting operation. The critical point of the partial tanning step is to firm the skins just enough to stand up under a knife and take an even split. The split, it has been found, is best accomplished if the knife cuts through relatively raw, untanned areas. To accomplish this end, the skins are subjected to the action of a tanning solution of great strength and high astringency, adapted to draw the grain area. As a preferred example, one thousand pounds of pickled salmon skins prepared as set forth above may be carefully laid into a vat of substantially the following composition:

| | |
|---|---|
| Common salt | lbs 320 |
| Cutch extract | lbs 80 |
| 3% bisulfited quebracho extract | lbs 80 |
| Synthetic tannin (Leucanol) | lbs 50 |
| Water | gals. @ 55° 500 |

After twenty-four hours soak in this solution, the skins will be sufficiently drawn to permit splitting.

The extracts employed in the preferred example are used because of their high astringency. Other extracts, although less efficient, may be employed. Synthetic tanning agents may be utilized as substitutes for the cutch and quebracho extracts of the preferred example. Leucanol, manufactured by the Rohm & Haas Company, and quebracho may be employed alone, without the cutch. Luecanol is the product of the condensation of phenolsulphonic acid with formaldehyde, and is used as a tanning adjuvant to increase the speed of penetration of the natural tannins. Orotan is another formaldehyde condensation product produced as a viscous liquid, and has tanning properties similar to the natural tannins. The important consideration is that the partial tanning bath be of high astringency and considerable strength. The bath should contain a minimum of one-half pound of tannin per gallon of liquor, and a practical upper limit of concentration might be set at five pounds of tannin per gallon of liquor. A high electrolyte is necessary to protect the skins, although it may obviously be derived from salts other than sodium chloride.

The surface hardening, partial tanning bath should be derived from unused extract, since the extracts lose astringency with use. This, of course, is directly opposed to usual tanning practice in which mildly exhausted solutions of a tannin are employed as starting vats. However, it has been found that the strongly astringent action of the partial tanning bath is essential to successful splitting, the bath operating to swell and draw the hides, and to elevate the scale pockets whereby they may be split off in the desired manner.

The time and concentration of the case-hardening step is variable within prescribed limits. For light skins, more dilute solution may be employed or the temperature lowered, or the time shortened as compared with heavy skins. Using higher temperatures, a shorter time may be employed. It is important, of course, to keep the bath temperature below the optimum growth temperature for spoilage organisms. Practical temperature limits are from 40° to 80° F. Below this range there is no action, and above 80° the skins are quickly destroyed. At 55° or 60°, about twenty-four hours soak is suitable to get the skins right for splitting. At 70°, about fifteen hours soak is sufficient, and at 50° about forty-eight hours are required. Outside limits of time for the partial tanning step range from approximately ten hours to five days. The true criterion of the time-temperature conditions of the surface hardening step is, of course, the result in the splitting stage, and since the skins and tanning agents are variable natural products, no definite conditions can be exactly set for all cases. The particular conditions within the aforesaid ranges to be employed with specific batches of skins accordingly, depend largely on the skill and judgment of the tanner, as is true of every other tannery operation.

When the skins have been sufficiently firmed by the partial tanning step, they are removed from the bath, washed lightly, and then split longitudinally. For this operation, the skins are rigidly supported from tail to head. The lagenous inside layer, and split from tail to head. The partial tanning, support of the skins, and direction of cut combine to provide sufficient rigidity to enable the skins to stand up under the knife, which cuts cleanly and smoothly through an interior, unhardened layer. A suitable splitting mechanism, adapted particularly to operate satisfactorily on skins prepared as described above, constitutes another part of the present invention, and is described in detail below. The splitter knife is adjusted to separate the scale-bearing layer of the skin from the collagenous material below without cutting into the grain layer, and, as previously indicated, functions best when cutting through a relatively raw area. Desirably, the knife is set to go through the skins just above the point of attachment of the scale pockets, whereby the keratinous material is substantially completely removed, but a sufficiently thick lamina thereof is retained to preserve the pattern of the scales, giving the finished leather a beautiful grain which would be impossible to imitate with an embosser.

After splitting, the skins may be hung on sticks and completely tanned, as by conventional vegetable tanning procedure. For example, the skins may be carried through a vegetable tan yard consisting of four stick vats and three layer vats. It will be evident that complete tanning of the skins is greatly facilitated by the preceding splitting process, since the fiber-bearing area of the skin is exposed thereby on both sides, whereby the tanning agents are permitted to permeate the collagenous material simultaneously from both surfaces. As previously indicated, it is essential to keep the temperature of the skins below the optimum growth temperature for spoilage organisms. An upper point of 70° to 80° F. is about right for the pre-tanning steps, and an upper point of 70° F. should be maintained in the stick section of the vegetable yard. A permissible high of 90° F. may be used in the layer vats.

When completely tanned, the skins are removed from the layers, and may be finished in conventional manner, the exact procedure employed depending primarily on market design and demand, as well as on the type of material at hand. As an example of conventional finishing procedure, the skins may be fat-liquored in drums, then sprayed lightly with a mineral oil-vegetable oil mixture and dried. They may be subsequently dyed, glazed, waxed, rolled and brushed, sprayed with a pigmented lacquer finish, dried, and finally rolled and brushed.

As indicated above, the skins are readied by the surface hardening treatment described for the splitting operation. In the drawings is illustrated a splitting machine ideally adapted to longitudinally split the skins when in surface hardened condition, and remove the scale pocket layer therefrom. Referring specifically to Figures 1, 2 and 3, the machine comprises a frame 10 supported by standards 11, and including plate-like side members 12. Suitably disposed between the side members is a cylindrical support member or drum 13, mounted upon a central shaft 14 which extends through the side members and is rotatably supported as by bearings 15 suitably carried by the frame.

An aperture 16 is provided in the surface of the drum, in which an opposed pair of clamp jaws 17 is pivotally mounted by means of pivot pins 18 extending therefrom into the drum. As is apparent in Figures 4 and 5, the clamp jaws are provided with knurled or otherwise suitably roughened jaw faces 19, and are adapted to be pivotally rotated into clamping engagement relative to each other, and inwardly out of clamping engagement. A simple mechanism is provided to operate the clamp jaws, comprising an actuating shaft 20 rotatably mounted in the discs 22 supporting drum 13 on its shaft 14. A link block 23 is affixed to the inner end of the actuating shaft, from the ends of which the pivoted links 24 extend to the clamp jaws. Actuating shaft 20 extends beyond the end of the drum, and is provided at the outer end thereof with an operating handle 25, whereby the actuating shaft may be rotated to effect through the link block and links pivotal rotation of the clamp jaws into and out of clamping engagement. The operation of the jaw actuating mechanism will be clearly apparent from Figures 4 and 5, wherein the relative positioning of the various elements corresponding to closed position of the jaws is illustrated in Figure 4, and the relative position corresponding to open position of the jaws is illustrated in Figure 5.

The fish skin 21 to be split is engaged to the drum support member by means of clamp jaws 17, as illustrated in Figure 4, by the tail end with the scale pocket layer outward. As will presently be described, the skin supporting drum is adapted to be driven in the clockwise direction, as indicated by the arrow, whereby the skin is carried under a guide roller to the splitting knife. The guide roller 26 is resiliently urged into contact with the drum surface, being retained thereagainst by the bushing blocks 27 extending from roller carriage 28. The roller carriage is supported by a plurality of spaced spring guides 29, extending to and through openings therefor in the transverse member 30 mounted between the side frames of the machine. The spring guides are slidably retained in the transverse member and their outwardly extended position relative to the transverse member is limited by nut 32. Coil springs 33 enclose the spring guides between transverse member 30 and the roller carriage 28, whereby the guide roller is constantly urged toward the drum support member. It will be noted that the guide roller supporting mechanism is angularly disposed to urge the roller not exactly toward the axis of the drum, but slightly to the leading side thereof, for reasons presently apparent.

Behind the guide roller in the direction of rotation, a knife guide 34 is pivotally mounted between the frame side members by the pivotal bolts 35 extending therefrom. As best shown in Figures 6 and 7, one end of the knife guide is formed into a guide block 36, containing guide grooves 37 in the sides thereof. Slidably retained in the guide grooves 37 is a knife carriage 38, to which the elongated knife 39 is fixedly secured, as by cover plate 40. As seen in Figure 3, knife 39 extends entirely across the length of the drum support member, being suitably guided and retained between the knife guide and the retaining plate 42 bolted thereto. Adjacent the end of the travel of the free end of the knife, a bumper 43, of resilient or other suitable material, may be secured between the retaining plate and the knife guide.

Adjacent the ends thereof, the knife guide is formed into bearing surfaces 44. Suitably mounted on the frame side members, as in the brackets 45, an adjusting screw 46 is disposed in contact with each of the bearing surfaces 44. As clearly shown in Figure 4, the adjusting screws are positioned and adapted to vary the pivotal position of the knife guide and knife retained thereon about pivot bolts 35 by rotation of the adjusting screws, and lock nuts 47 may be provided thereon to fix the adjusting screws in desired position.

Mechanism is provided to reciprocate the knife carriage and knife secured thereto. In the exemplary embodiment, reciprocation of this unit is effected by an electric motor 48, suitably mounted on the frame and arranged to rotate the shaft 49 through pulleys 50 and 52 joined by the belt 53. Shaft 49 is rotatably supported in bearings 54, suitably affixed to the adjacent frame side member by means of brackets 55 extending therefrom. The inner end of shaft 49 is formed into boss 56, from which extends an eccentric pin 57. A link 58 is engaged to the eccentric pin and extends therefrom to the pivot block 59, to which it is pivotally secured by means of bolt 60. Opposed pin portions 62 extend laterally from the pivot block (see Figure 6), by means of which the pivot block is pivotally engaged to cover plate 40 of the knife carriage, by means of the sleeve portions 63 extending therefrom. The flexible connection described permits angular adjustment of the knife guide, knife carriage and knife unit without interference with the driving connection between the link 58 and the knife carriage.

A second motor 64, provided with a reduction gear box 65, is provided on the frame and arranged to drive the drum 13 through pulleys 66 and 67 and the belt 68 therebetween. Pulley 67 is affixed to one end of the suitably mounted shaft 69, at the other end of which is provided a pulley 70, by means of which rotation of shaft 69 is conveyed through belt 72 to the pulley 73 of a conventional single revolution clutch indicated generally as 74. The clutch 74 is affixed also to drum shaft 14, and is of a conventional type adapted when engaged by rotation of the drum to predetermined position to drive the drum through the remainder of a complete revolution. It will be recognized that the clutch 74 may be omitted from the mechanism, and the shaft 14 driven directly from motor 64. Also, motors 48 and 64 may be replaced by a single drive means, if desired.

With the mechanism in the starting position shown in Figure 1, a fish skin prepared as previously described may be engaged to drum 13 by inserting the tail thereof between the clamp jaws 17, with the scale pocket layer outward, and the skin engaged to the drum by manually rotating handle 25, whereby the clamp jaws are pivoted into operative clamping engagement as previously described. Motor 64 being energized, manual rotation of the drum a predetermined distance from starting position will effect engagement of the single revolution clutch 74, whereby the drum and the skin carried thereby will be caused to rotate at the desired speed.

The motor 48 being also energized, shaft 49 will be rotated and the link 58 caused to reciprocate by the eccentric pin extending from boss 56 at the inner end of the shaft. Reciprocating movement of the link is effective through pivot block 59 to reciprocate knife carriage 38 and knife 39. The skin is carried by the rotation of drum 13 first beneath the guide roller 26, which functions to flatten and suitably extend the skin for splitting by the knife. It will be recognized that the guide roller by reason of its resilient mounting is permitted to be displaced outwardly from the drum, but is constantly urged theretoward by the pressure of springs 33. The guide roller is disposed immediately adjacent the edge of the knife, whereby it functions effectively to retain and guide the skin in flattened, extended condition into and through the splitting operation. This effect is enhanced, it is found, by the illustrated angular disposition of the guide roller mounting.

After passage under the guide roller, the skin is longitudinally split by the reciprocating knife, and the scale pocket layer is severed therefrom and passes over the knife and knife guide for suitable disposition. The cycle of operation is continued by the clutch until the drum is returned to initial starting position, at which time the skin has been completely split and may be removed from the clamp jaws by rotation of handle 25 and actuating shaft 20, and replaced therein by another skin to be split, whereupon the operation is repeated.

The spacing between the edge of the knife and the periphery of the drum is adjusted to cut through the skin at the base of the scale pocket layer, or preferably at a level just above the base of the scale pocket layer, whereby the keratinous material is substantially entirely removed, or in the preferred case only a very thin lamina thereof is permitted to remain, adequate to retain on the surface of the skin the original scale pattern. As previously indicated, the spacing of the knife edge relative to the drum is varied by means of the adjusting screws 46 operative upon bearing surfaces 44 of the knife guide, and may be adjusted as required to properly split varying batches of skins.

It will be recalled that when split the skins are only partially tanned, that is to say merely surface hardened, whereby the interior portion thereof remains in raw, unhardened state. The undersurface of the skin is sufficiently firmed to impart adequate rigidity thereto, when backed by the drum supporting member, to stand up under the knife and permit splitting. The raw interior of the skin is best adapted to cutting, but even so the splitting operation remains critical, and for a smooth, even split necessitates a relatively high knife speed as related to the feed of the skin into the knife. For this reason, a peripheral speed for the drum of about ten feet per minute has been found to be a practical maximum rate of feed into the knife, for even relatively high knife speeds.

Having been split, as described, by the splitting machine, the skin may then be completely tanned and finished as previously described, whereby a durable and exceedingly strong full-grained leather is obtained. Removal of substantially the entire keratinous layer therefrom permits tanning of the skins thereafter in conventional manner, since both surfaces of the collagenous layer as exposed thereby to the tanning materials.

If the split is made just above the base of the scale pocket layer, an attractive, distinctive grain pattern is obtained on the finished leather which is highly desirable, and which clearly identifies the material. In Figure 8 is shown a small section of tanned salmon skin prepared according to the invention, from the left-hand portion 75 of which the scale pocket layer has been removed as described. The scale pocket layer has not been severed from the right-hand portion 76, whereby a horny, scalar, unsightly product is obtained as shown. A section through the material is shown in Figure 9, wherein appear the tanned fiber layers 77, and on the right-hand portion thereof the keratinous scale pocket layer 78, with scale pockets 79 therein. From the left-hand portion the scale pocket layer has been substantially completely removed, leaving only a very thin lamina 80 of keratinous material on the surface of the leather.

It will thus be seen that there has been provided by this invention a structure in which the various objects hereinbefore set forth, together with many practical advantages, are successfully achieved. As various possible embodiments may be made of the mechanical features of

We claim:
1. A process for the manufacture of leather from teleost fish skin which comprises the steps of surface hardening the skin by partial tanning, removing the scale pockets therefrom by splitting through an interior unhardened layer, and then completely tanning the skin.

2. A process for the manufacture of leather from teleost fish skin which comprises the steps of surface hardening the skin by partial tanning in a bath of high strength and astringency, removing the scale pockets therefrom by splitting through an interior unhardened layer, and then completely tanning the skin.

3. A process for the manufacture of leather from teleost fish skin which comprises the steps of surface hardening the skin by partial tanning in an astringent bath containing from 0.5 to 5.0 pounds of tannin per gallon, removing the scale pockets therefrom by splitting through an interior unhardened layer, and then completely tanning the skin.

4. A process for the manufacture of leather from teleost fish skin which comprises the steps of surface hardening the skin by tanning in a bath of substantially the following composition:

| | |
|---|---|
| Common salt | lbs__ 320 |
| Cutch extract | lbs__ 80 |
| 3% bisulfited quebracho extract | lbs__ 80 |
| Tannin | lbs__ 50 |
| Water | gals__ 500 | at a temperature between 40° F. and 80° F. for a period between ten hours and one hundred and twenty hours, removing the scale pockets therefrom by splitting through an interior unhardened layer, and then completely tanning the skin.

5. A process for the manufacture of leather from the skin of teleost fishes which comprises the steps of surface hardening the skin by partial tanning, splitting the skin longitudinally through the base of the scale pocket layer to remove the scale pockets therefrom and then completely tanning the skin.

6. A process for the manufacture of leather from teleost fish skin which comprises the steps of soaking the skin in a mildly alkaline bath, pickling the skin in an alum bath, surface hardening the skin by partial tanning, removing the scale pockets therefrom by splitting through an interior unhardened layer, completely tanning the skin, and finishing the leather so obtained.

7. A process for the manufacture of leather from teleost fish skin which comprises the steps of surface hardening the skin by partial tanning, supporting the collagenous side of the skin so treated on a rigid surface, splitting the skin longitudinally through an interior unhardened layer while so supported to remove the scale pockets therefrom, and then completely tanning the skin.

8. A process for the manufacture of leather from teleost fish skin which comprises the steps of surface hardening the skin by partial tanning, supporting the collagenous side of the skin so treated on a rigid support member, splitting the skin longitudinally from tail to head through an interior unhardened layer while so supported to remove the scale pockets therefrom, and then completely tanning the skin.

References Cited in the file of this patent

UNITED STATES PATENTS

| | | |
|---|---|---|
| 1,338,531 | Roger | Apr. 27, 1920 |
| 1,430,479 | Wayland | Sept. 26, 1922 |
| 1,842,534 | Brill | Jan. 26, 1932 |
| 2,109,572 | Lloyd | Mar. 1, 1938 |
| 2,210,581 | Goerk | Aug. 6, 1940 |
| 2,222,656 | Erkel | Nov. 26, 1940 |
| 2,460,934 | Hazelton | Feb. 8, 1949 |

FOREIGN PATENTS

| | | |
|---|---|---|
| 278,885 | Great Britain | Oct. 20, 1927 |
| 331,241 | Great Britain | Mar. 26, 1929 |

OTHER REFERENCES

"The Manufacture of Chrome Leather," p. 399, by Lamb, published by the Anglo-American Technical Co., Ltd., London, England, 1923.

"The Chemistry of Leather Manufacturing," by Wilson, 2nd ed., published 1928, by the Chem. Catalog Co., Inc., N. Y. C., vol. I, pp. 73 and 74, vol. II, p. 534.